Oct. 23, 1923.  
A. J. HARTLEY  
FEEDER  
Filed Nov. 21, 1921  
1,471,894  
3 Sheets-Sheet 2

Witnesses
Inventor
Arthur J. Hartley
By Jefft & Jefft
Attorney

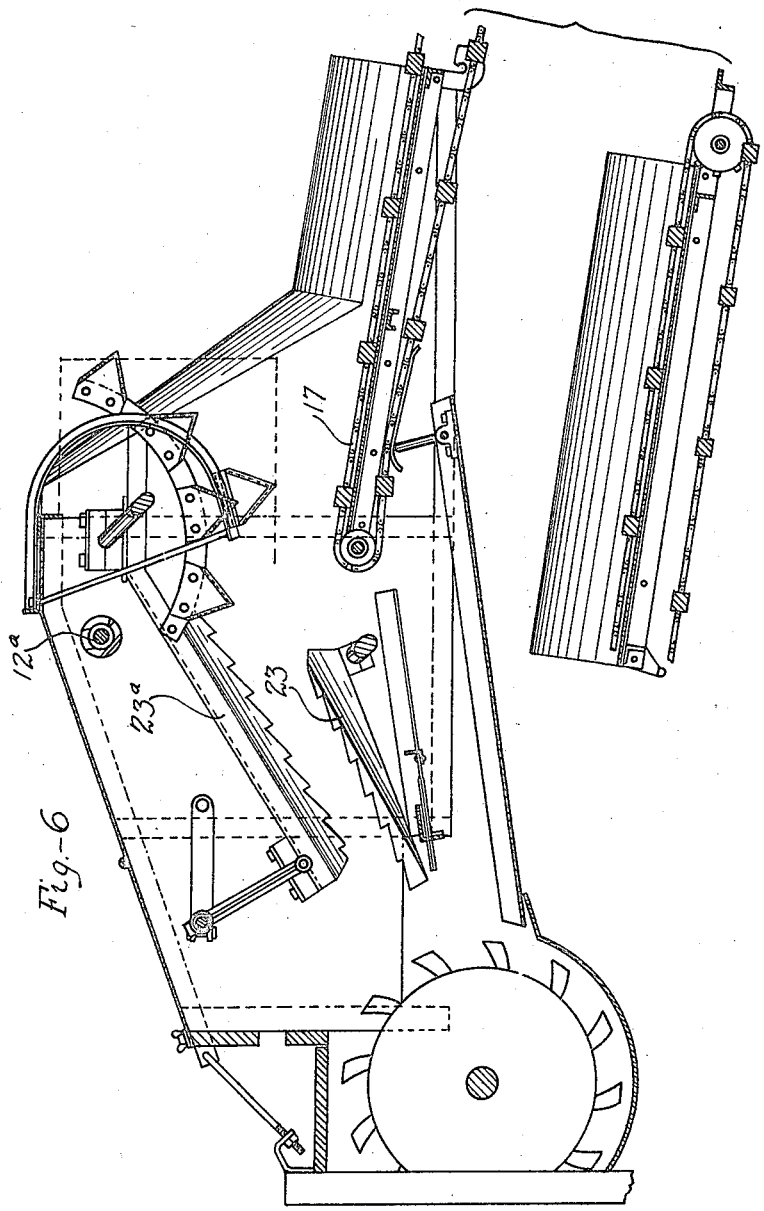

Patented Oct. 23, 1923.

1,471,894

UNITED STATES PATENT OFFICE.

ARTHUR J. HARTLEY, OF PEORIA, ILLINOIS, ASSIGNOR TO HART GRAIN WEIGHER CO., OF PEORIA, ILLINOIS, A CORPORATION.

FEEDER.

Application filed November 21, 1921. Serial No. 516,524.

*To all whom it may concern:*

Be it known that I, ARTHUR J. HARTLEY, a citizen of the United States of America, residing at Peoria, in the county of Peoria and State of Illinois, have invented certain new and useful Improvements in Feeders, of which the following is a specification.

My invention relates to feeders and more particularly to a class of feeders whereby bundles of grain are fed to a thresher. The type of feeder above described is clearly described in my co-pending application Number 445,660, filed February 17, 1921.

My invention more particularly relates to a special mechanism on the feeder whereby the action thereof is controlled in such manner that there will be an even feed supply to the thresher cylinder at all times.

The object of my invention is in the provision of special mechanism in connection with a feeder for automatically controlling the feed supply to the thresher cylinder.

Another object of my invention is in a special gear mechanism for automatically controlling the operation of the lower feed pans and draper in a feeder regardless of the rate of speed of the band cutters.

Other objects of my invention will appear in the following specification in connection with the annexed drawing, in which;

Figure 6 is a sectional view in side elevation of the feeder mechanism showing in detail the arrangement of the various parts.

Figure 1:
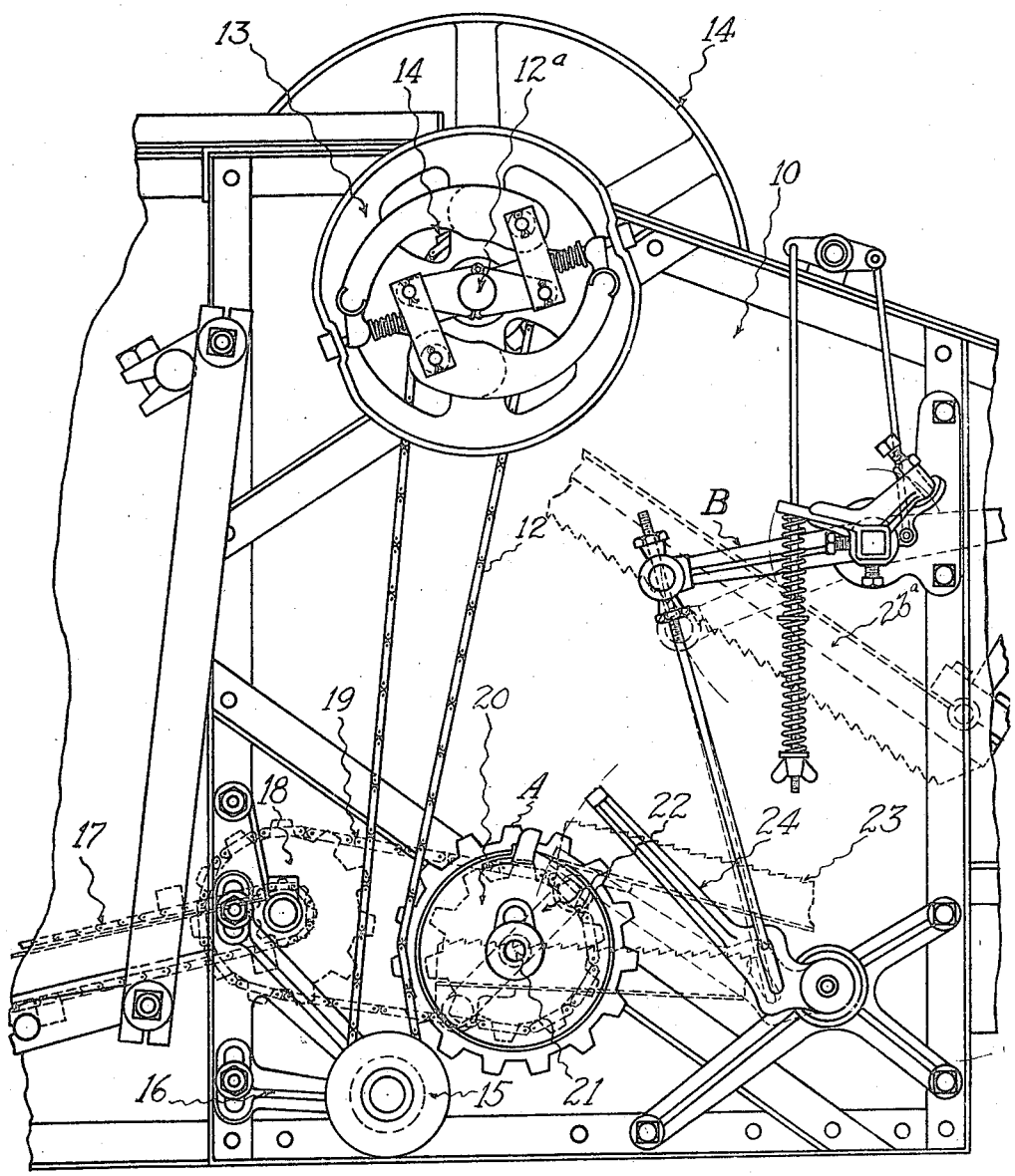
Figure 1 shows a partial side elevation of a feeder shown in detail in my co-pending application as above stated.
Figure 2:
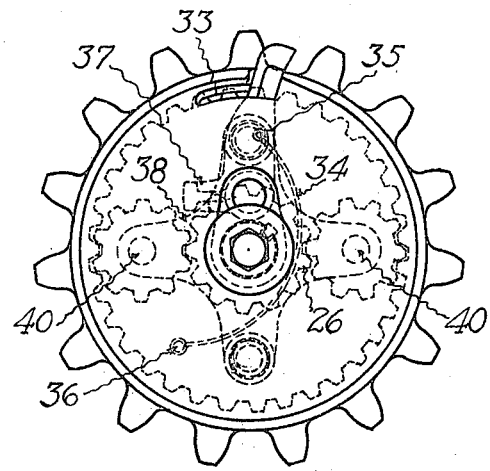
Figure 2 is a front elevation of the special gearing mechanism.
Figure 3:
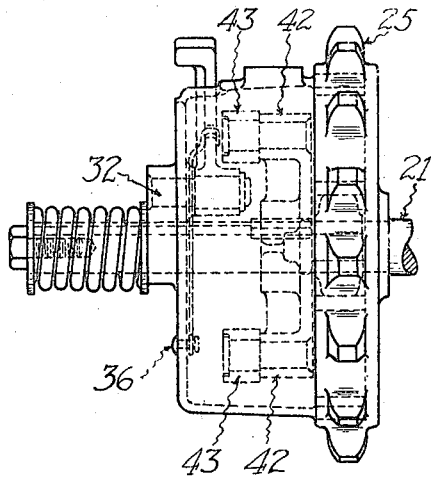
Figure 3 is a side elevation thereof.

Referring to the drawings and especially to Figure 1 it may be said that only a portion of the feeder mechanism has been illustrated here, inasmuch as this application is directed only to a control thereof.

This feeder in detail is shown in my copending application and for this reason I do not consider it necessary to go into but a brief description of the conventional parts thereof.

10 refers generally to the frame portion of the feeder. The power wheel 11 has connection with any suitable power means. The power wheel is mounted on a shaft $12^a$ which has a governor 13 attached to its opposite end. The chain 12 passes over the sprocket 14 positively connected to the shaft $12^a$ and also, around an idler 15 suitably and adjustably attached to the frame portion as shown at 16. The conventional draper is shown at 17 and having power transmitted thereto through the sprocket 18 and chain 19 which has connection with a second sprocket 20 mounted on one end of a shaft 21. Shaft 21 has a special gearing mechanism designated generally as A mounted upon its opposite end, this gear mechanism forming the basis for this application and will be described in detail later. The gearing mechanism A has a sprocket wheel thereon engaging the chain 12 which has connection with the power shaft of the feeder. Shaft 21 which has mounted at one end the sprocket 20 for transmitting power to the draper and at its other end the gear mechanism, has crank arms 22 thereon which give a corresponding movement to lower feed pans 23. It is apparent from the gearing shown in Figure 1, that in the normal operation the lower feed pans are operating at a somewhat lower speed than the upper, in fact, in the ratio of about 3 to 2.

The above mechanism with the exception of the special gear mechanism is shown in my co-pending application and, as is also the trip mechanism designated generally as B. This trip mechanism has operable connection with upper feed pans $23^a$ in the feeder. The raising and lowering of these conventional upper feed pans throws the trip lever 24 into or out of engagement with the special gear mechanism to be described.

Figure 4:
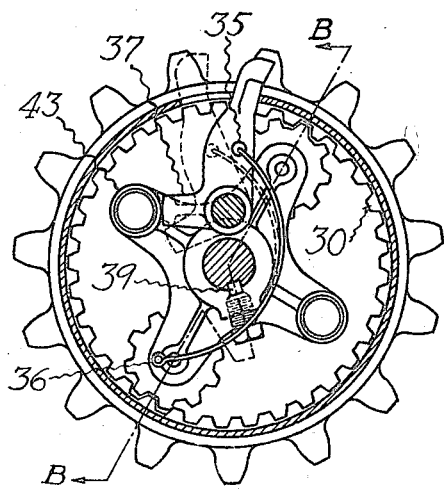
Figure 4 is a longitudinal sectional view taken on the line A—A of Figure 5.
Figure 5:
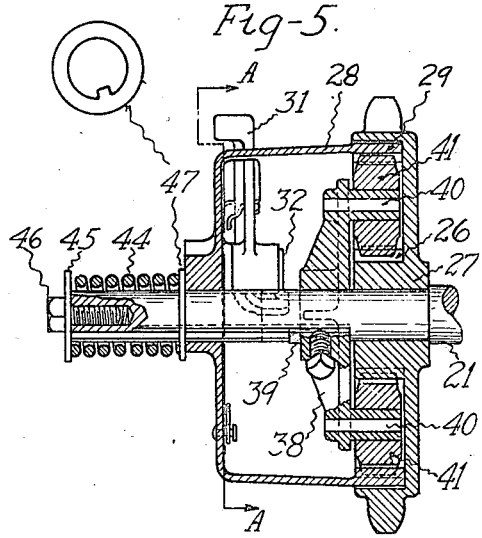
Figure 5 is a cross sectional view taken on the line B—B of Figure 4.

As has been said before my special gear mechanism is provided for controlling the operation of the lower feed pans and draper member with the result that an even feed supply is carried to a thresher cylinder not shown. The above mechanism includes the following elements;

A sprocket wheel 25 is loosely mounted on the shaft 21 and has engagement at all times with the constantly moving power chain 12. The sprocket 25 has a small gear 26 cast integrally with its hub portion 27. A housing member 28 is also loosely mounted on the shaft 21 and has its open end portion 29 projecting within the sprocket 25. On the inner side of the periphery of the housing 28 are cast teeth 30 which form an internal gear. A dog 31 is pivotally mounted as at 32 on the housing 28, the outer end of said dog projecting through a slot 33 therein. The dog 31 is held in outwardly tensioned position by means of a spring 34 attached as at 35 to the dog and at 36 to the housing plate. The dog 31 has an engagement lug 37 projecting at right angles therefrom and capable of engagement with friction rollers to be later described. A spider 38 is keyed as at 39 to the shaft 21 and pivotally mounted as at 40 on two of the projecting ends of said spider are gear wheels 41 engaging the internal gear 30 and the small gear 26 on the housing portion of the sprocket 25. Projecting in the opposite direction from the former projecting ends of the spider are hubs 42 which have friction rollers 43 thereon. In Figure 4 of the drawings, the position of the friction rollers with relation to the engagement lug 37 on the dog 31 is clearly shown and it may be said that movement of said dog permits engagement or non-engagement therebetween.

A spring 44 surrounds the projecting end of the shaft 21, and a washer 45 and screw 46 provide means for positively positioning it thereon. A washer 47 between the inner end of the spring and housing 28 has an inner projection thereon engaging the keyway on the shaft 21 and therefore preventing any rotation of the spring about the shaft 21 when the shaft is moving and the housing is stationary. This particular means prevents such rotation of the spring which might result in an unscrewing of the lock member 46. It may be added that this tensioning of the housing on the sprocket with a corresponding tensioning of the dog or rather its engagement lug with the friction rollers prevents any chattering, and a quietly running mechanism results.

The operation of the device is as follows:

As is shown in my co-pending application, the bundles of grain are carried by the draper to the operating portions of the feeder and it sometimes happens that an over supply of the grain is carried to the feed pans with the result that an uneven supply is fed to the thresher cylinder. The usual means for taking care of this over feeding is to either stop the action of the lower feed pans, or the draper, or both, but with my improved means, I am able in the case of over feeding to merely retard the action of the lower feed pans and draper but not stop them, with the result that instead of carrying either too small or too large an amount of grain to the thresher cylinder, there will be an approximately even feeding at all times. In the normal operation of the device the chain 12 constantly rotates the sprocket wheel 25 which has its inner gear 26 meshing with the teeth on the two small gears 41 on the spider. When the dog is in its normal or extended position the engagement lug 37 thereof will abut the friction rollers 43 on the spider with the result that the gears 41 will be locked with relation to the inner gear 30 of the housing member and gear 26 on the hub portion of the sprocket. The above action will result in the rotation of the whole gear mechanism and therefore the shaft 21 at the same speed that the sprocket 25 moves. However, in a case of over feeding the trip 24 is thrown into engagement with the dog 31 and hence throws said dog to the dotted line position shown in Figure 4 where it is held by the pressure of said trip until the over supply of grain is taken care of in the feed pans. When this dog is thrown to the dotted line position, the engagement lug 37 is thrown to a position where it will not engage the friction rollers 43 on the spider 38. This permits the spider 38 to rotate, the small gears 41 meshing with the inner gear 30 and the small gear 26 on the hub of the sprocket 25. At the same time, the housing 28 is not permitted to move due to the pressure of the trip 24 against the dog 31. Inasmuch as the sprocket 25 is always turning the power transmitted to the shaft 21 will now be through the spider 38 or rather, through its small gears 41 which mesh with the gear 26. The result is that due to this gearing a lower speed of rotation is given to the shaft 21 than it would have in its normal operation where the whole gearing mechanism is rotating. Slowing up of the shaft 21 also retards the action of the lower feed pans 23 and inasmuch as the draper 17 has direct power connection with this shaft, it also has its speed retarded in a similar degree.

Hence we see that an over feeding will result in automatically retarding the movement of the lower feed pans and draper until such over supply has been taken care of and also with the result that an even amount of grain is fed at all times to the thresher cylinder.

What I claim is:

1. In a feeding device, in combination, a feeder mechanism including a constantly operating power shaft, a conveyer member operated by the power shaft, upper and lower feeder elements, a crank shaft having operable connection with said power shaft, and carrying the lower feeder element, and means for automatically reducing the speed of the conveyer and crank shaft including, a sprocket wheel loosely mounted on the crank shaft, a housing member, a spider keyed to the crank shaft and having gears thereon in engagement with the housing member and sprocket wheel, and means including a trip mechanism for providing an optional locking of the housing member with the sprocket wheel.

2. In a feeding device, in combination, a feeder mechanism, including a constantly operating power shaft, a conveyer member operated by the power shaft, feeder elements including lower feed pans having operable connection with said power shaft, a crank shaft for said feed pans, and means for automatically reducing the speed of the conveyer and feed pans including a sprocket wheel loosely mounted on the crank shaft, a housing member, and gear mechanism engaging the sprocket wheel and housing member.

3. In a feeding device, in combination, a feeder mechanism including a constantly operating power shaft, a conveyer member operated by the power shaft, feeder elements including lower feed mechanism having operable connection with said power shaft, a crank shaft for said lower feed mechanism, and means for automatically reducing the speed of the conveyer, and lower feed mechanism, including a sprocket wheel loosely mounted on the crank shaft, a housing member, gear mechanism engaging the sprocket wheel and housing member, and a spring means for tensioning the housing member with relation to the sprocket wheel and gear mechanism.

4. In a feeding device, in combination, feeder mechanism including a constantly operating power shaft, a conveyer member operated by the power shaft, lower feed pans having an operable connection with the power shaft, a crank shaft for said feed pans, and means for automatically reducing the speed of the conveyer and feed pans including a sprocket wheel loosely mounted on the crank shaft, a housing member, gear connection between the housing member and the sprocket wheel, and trip mechanism providing an optional locking engagement of the gear mechanism with the sprocket and housing member.

5. In a feeder mechanism, in combination, a constantly operating power shaft, a conveyor member, feeder means, normally spaced apart and relatively separable under the action of variable quantities of material passing therethrough, and means for automatically reducing the speed of one of the feeder elements and conveyor members without affecting the speed of the power shaft, including a single driving connection between the main power shaft and said feeder elements, and a clutch and gear mechanism, including a series of internally arranged gears and co-related clutching mechanism mounted on a single shaft.

6. In a feeding device, in combination, a constantly operating power shaft, feeder means normally spaced apart and relatively separable under the action of variable quantities of material passing therebetween, a single driving means between the main power shaft and one of the feeder elements and a clutch and gear for automatically reducing the speed of said feeder elements without affecting the speed of the power shaft, including an internal gear engaging the driving connection for the feeder element, a series of internally arranged gears and a co-related clutching mechanism in operable connection therewith.

7. In a thrashing machine feeder, including the combination of upper and lower distributing and feed regulating mechanism, adapted to advance material at differing speeds with increasing pressure and volume capacity as the quantity of material increases, a main conveyor adapted to deliver material between said feed regulating and distributing mechanisms and means for retarding the movement of the main conveyor and also reducing the speed of the lower feed mechanism when the upper feed mechanism has reached the limit of its upper movement.

In testimony whereof I have affixed my signature.

ARTHUR J. HARTLEY.